(12) United States Patent
Cervenak et al.

(10) Patent No.: US 8,943,209 B2
(45) Date of Patent: Jan. 27, 2015

(54) METHODS, SYSTEMS, AND COMPUTER READABLE MEDIA FOR POLICY AND CHARGING RULES FUNCTION (PCRF) FAULT TOLERANCE

(75) Inventors: Bradford Cervenak, Westborough, MA (US); Yusun Kim Riley, Weston, MA (US); Uri Baniel, Buffalo Grove, IL (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 496 days.

(21) Appl. No.: 13/244,259

(22) Filed: Sep. 23, 2011
(Under 37 CFR 1.47)

(65) Prior Publication Data

US 2012/0221899 A1 Aug. 30, 2012

Related U.S. Application Data

(60) Provisional application No. 61/390,909, filed on Oct. 7, 2010.

(51) Int. Cl.
*G06F 15/16* (2006.01)
*G06F 11/00* (2006.01)
(Continued)

(52) U.S. Cl.
CPC ............... *G06Q 10/10* (2013.01); *H04M 15/66* (2013.01); *H04M 15/64* (2013.01); *H04M 7/00* (2013.01)
USPC ............... 709/228; 709/223; 714/4.1; 714/21

(58) Field of Classification Search
USPC ................................................ 709/223, 228
See application file for complete search history.

(56) References Cited

U.S. PATENT DOCUMENTS 7,257,636 B2 * 8/2007 Lee et al. ................. 709/229
2007/0094712 A1 * 4/2007 Gibbs et al. ................. 726/3
(Continued)

FOREIGN PATENT DOCUMENTS

| FI | 1 988 680 B1 * | 4/2007 | ............... H04L 29/06 |
| FI | WO 2010/142327 A1 * | 12/2010 | ............... H04L 29/08 |
| WO | WO 2010/142327 A1 * | 12/2010 | ............... H04L 29/08 |

OTHER PUBLICATIONS

RFC 3539—(AAA) Transport Profile (Jun. 2003).*
(Continued)

*Primary Examiner* — David Lazaro
*Assistant Examiner* — Robert Shaw
(74) *Attorney, Agent, or Firm* — Jenkins, Wilson, Taylor & Hunt, P.A.

(57) ABSTRACT

Methods, systems, and computer readable media for PCRF fault tolerance are disclosed. One exemplary method for PCRF fault tolerance includes sending, from the PCRF to a Diameter peer, a message concerning Diameter application session state information associated with Diameter application sessions currently or previously managed by the PCRF. The method further includes receiving, by the PCRF, a message from the Diameter peer in response to the message concerning the Diameter application session state information. The method further includes determining, by the PCRF and based on the response, whether the Diameter application session state information maintained by the PCRF is accurate. The method further includes, in response to determining that the Diameter application session state information maintained by the PCRF is not accurate, requesting, by the PCRF, Diameter application session state information.

20 Claims, 8 Drawing Sheets

(51) Int. Cl.
*G06Q 10/10* (2012.01)
*H04M 15/00* (2006.01)
*H04M 7/00* (2006.01)

(56) References Cited

U.S. PATENT DOCUMENTS

| | | | | |
|---|---|---|---|---|
| 2008/0250156 | A1* | 10/2008 | Agarwal et al. | 709/235 |
| 2008/0271113 | A1* | 10/2008 | Belling | 726/1 |
| 2008/0310334 | A1* | 12/2008 | Nakamura et al. | 370/310 |
| 2009/0080440 | A1* | 3/2009 | Balyan et al. | 370/400 |
| 2009/0129271 | A1* | 5/2009 | Ramankutty et al. | 370/235 |
| 2009/0141625 | A1* | 6/2009 | Ghai et al. | 370/230 |
| 2009/0156213 | A1* | 6/2009 | Spinelli et al. | 455/436 |
| 2010/0020812 | A1* | 1/2010 | Nakamura et al. | 370/401 |
| 2010/0027448 | A1* | 2/2010 | Puthiyandyil et al. | 370/310 |
| 2010/0154031 | A1* | 6/2010 | Montemurro et al. | 726/1 |
| 2010/0188975 | A1* | 7/2010 | Raleigh | 370/230.1 |
| 2010/0284336 | A1* | 11/2010 | Rui et al. | 370/328 |
| 2010/0299451 | A1* | 11/2010 | Yigang et al. | 709/241 |
| 2010/0311392 | A1* | 12/2010 | Stenfelt et al. | 455/411 |
| 2010/0312740 | A1* | 12/2010 | Clemm et al. | 706/47 |
| 2010/0329243 | A1* | 12/2010 | Buckley et al. | 370/352 |
| 2010/0329244 | A1* | 12/2010 | Buckley et al. | 370/352 |
| 2011/0075557 | A1* | 3/2011 | Chowdhury et al. | 370/230 |
| 2011/0075675 | A1* | 3/2011 | Koodli et al. | 370/401 |
| 2011/0122870 | A1* | 5/2011 | Dixon et al. | 370/389 |
| 2011/0141947 | A1* | 6/2011 | Li et al. | 370/259 |
| 2011/0208853 | A1* | 8/2011 | Castro-Castro et al. | 709/223 |
| 2011/0211465 | A1* | 9/2011 | Farrugia et al. | 370/252 |
| 2011/0302289 | A1* | 12/2011 | Shaikh et al. | 709/223 |
| 2011/0320323 | A1* | 12/2011 | Cuervo | 705/30 |
| 2011/0320544 | A1* | 12/2011 | Yee et al. | 709/206 |
| 2012/0005357 | A1* | 1/2012 | Hellgren | 709/229 |
| 2012/0096177 | A1* | 4/2012 | Rasanen | 709/228 |
| 2012/0102174 | A1* | 4/2012 | Zhou et al. | 709/223 |
| 2012/0202491 | A1* | 8/2012 | Fox et al. | 455/435.1 |
| 2012/0314632 | A1* | 12/2012 | Martinez De La Cruz et al. | 370/310 |

OTHER PUBLICATIONS

RFC 3588—"Diameter Base Protocol" (Sep. 2003).*
3rd Generation Partnership Project; Technical Specification Group Core Network and Terminals; Study on PCRF failure and restoration (Release 9) 3GPP TR 29.816 V1.1.0, 3GPP (May 2010).*
Liebsch & Punz, Diameter General Purpose Session draft-liebsch-dime-diameter-gps-00.txt Jun. 29, 2010.*
Pencheva et al, Cross Layer Design of Application-level Resource Management Interfaces, IEEE (2009).*
Pencheva et al Web Services for Quality of Service Monitoring IEEE (2009).*
Sou et al, Design and Implementation of Policy and Charging Control System for Advanced Mobile Services, ICICS 2009, IEEE (2009).*
Bengtsson,How to Enable Better Service Assurance Using the PCRF, Master of Science Thesis KTH Computer Science, Stockholm, Sweden 2006.*
Znaty, "DIAMETER, GPRS, (LTE+ePC=EPS), IMS, PCC and SDM," EFORT (May 2010). (Part 1 of 2, pp. 1-229).
Znaty, "DIAMETER, GPRS, (LTE+ePC=EPS), IMS, PCC and SDM," EFORT (May 2010). (Part 2 of 2, pp. 230-460)
"3rd Generation Partnership Project; Technical Specification Group Core Network and Terminals; Study on PCRF failure and restoration (Release 9)," 3GPP TR 29.816 V1.1.0, pp. 1-60 (May 2010).
"3rd Generation Partnership Project; Technical Specification Group Core Network and Terminals; Policy and Charging Control over Gx reference point (Release 9)," 3GPP TS 29.212 V9.2.0, pp. 1-111 (Mar. 2010).
"3rd Generation Partnership Project; Technical Specification Group Services and System Aspects; Policy and charging control architecture (Release 8)," 3GPP TS 23.203 V8.1.1, pp. 1-87 (Mar. 2008).

* cited by examiner

METHODS, SYSTEMS, AND COMPUTER READABLE MEDIA FOR POLICY AND CHARGING RULES FUNCTION (PCRF) FAULT TOLERANCE

PRIORITY CLAIM

This application claims the benefit of U.S. Provisional Patent Application Ser. No. 61/390,909 filed Oct. 7, 2010; the disclosure of which is incorporated herein by reference in its entirety.

TECHNICAL FIELD

The subject matter described herein relates to fault tolerance. More specifically, the subject matter relates to methods, systems, and computer readable media for PCRF fault tolerance.

BACKGROUND

A policy and charging rules function (PCRF) is a network device that manages policy rules for end users. A PCRF can add and re-configure policies to do things such as manage and control Quality of Service (QoS), charging, quota, optimization and admission control. Conventional PCRF operation requires that the PCRF maintain state information about active Diameter application sessions it handles. Such sessions may include, for example, Gx, Gxx, Rx, and S9 sessions. In the event that a PCRF suffers a hardware or software failure (e.g., crash and/or reboot), the PCRF may lose some or all of its state information.

In order for the PCRF to recover any lost state information, the PCRF conventionally requests a replay of all state information. However, one problem with this conventional procedure is that if the PCRF asks a Gx client (i.e., enforcement function) to replay all of the Gx sessions state/information, it may negatively impact the network or other performance associated with the PCRF. This problem may be further exacerbated when there are multiple Gx clients for a given PCRF, because each Gx client may handle hundreds of thousands or millions of active Gx sessions. Yet a replay of all of the Gx sessions/state information may be (at least partly) unnecessary if the PCRF has retained some of the information after recovering from the failure.

Accordingly, in light of these difficulties, a need exists for improved methods, systems, and computer readable media for providing PCRF fault tolerance with minimal performance impact.

SUMMARY

Methods, systems, and computer readable media for PCRF fault tolerance are disclosed. One exemplary method for PCRF fault tolerance includes sending, from the PCRF to a Diameter peer, a message concerning Diameter application session state information associated with Diameter application sessions currently or previously managed by the PCRF. The method further includes receiving, by the PCRF, a message from the Diameter peer in response to the message concerning the Diameter application session state information. The method further includes, determining, by the PCRF and based on the response, whether the Diameter application session state information maintained by the PCRF is accurate. The method further includes, in response to determining that the Diameter application session state information maintained by the PCRF is not accurate, requesting, by the PCRF, Diameter application session state information.

An exemplary system for PCRF fault tolerance is also disclosed. The system includes a Diameter application session state information request module for sending, from the PCRF to a Diameter peer, a message concerning Diameter application session state information associated with Diameter application sessions currently or previously managed by the PCRF. The system further includes a Diameter application session state information validation module for receiving a response from a Diameter peer in response to the message concerning the Diameter application session state information and for determining, based on the response, whether the Diameter application session state information maintained by the PCRF is accurate, wherein, in response to a determination that the Diameter application session state information is not accurate, the Diameter application session state information request module is configured to request Diameter application state information.

Another exemplary system for PCRF fault tolerance is also disclosed. The system includes a Diameter signaling router (DSR). The DSR includes a Diameter application session state information cache for maintaining Diameter application session state information concerning Diameter application sessions currently or previously managed by a PCRF. The system further includes a Diameter application session state information cache interface module for receiving, from the PCRF, a message concerning Diameter application session state information maintained by the PCRF regarding application sessions currently or previously managed by the PCRF and for responding to the message based on the Diameter application session state information stored in the cache.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which.

DETAILED DESCRIPTION

The subject matter described herein for performing PCRF fault tolerance may include applying a smart/gradual algorithm, which will attempt to recover the state with a minimal performance impact. For example, after a PCRF recovers from a failure (e.g., software and/or hardware failure requiring a reboot), it may determine that it has retained the state information for some (or even all) of the Diameter application sessions it handled, it has lost all state information, or that it does not know whether the Diameter application session state information that it has after recovery is valid. If the PCRF determines that it has lost all state information, the PCRF may send an out of band replay-all request to a gateway, such as a gateway GPRS support node (GGSN), an enforcement function, such as a broadband remote access server (BRAS), a proxy call session control function (P-CSCF), a policy and charging enforcement function (PCEF), a packet data network (PDN) gateway, a Diameter application server, a deep packet inspection (DPI) function, or a Diameter signaling router (DSR) that caches Diameter application session state information. It may be appreciated that the terms enforcement function and gateway may be used interchangeably throughout to refer to any node capable of processing a replay all request message for providing state information for Gx (or similar interfaces) from a PCRF. In response, the enforcement function may then simply replay-all (i.e., return all state information for all Gx sessions).

If, instead, the PCRF determines that some of the state information has been retained or that the PCRF does not know whether the state information that it has after recovery is valid, the PCRF may send the enforcement node or other node an out of band message with an educated "guess" regarding the missing state information. This guess may include a number of active Gx sessions and/or a checksum of the Gx Origin-State-Id over all of the Gx sessions. For example, in one possible embodiment, the checksum may simply be the sum of the Origin-State-Ids. Thus, for 10,000 Gx sessions, out of which 5,000 have Origin-State-Id=1 and 5,000 have Origin-State-Id=2, the checksum would be 15,000. The node that receives the out of band message may be any of a PCEF node, PDN gateway, a Diameter application server, a DPI node, or a DSR.

If the out of band response returned to the PCRF indicates that the educated guesses for both the number of active Gx sessions and the checksum of the Gx Origin-State-Id over all of the Gx sessions was correct, then the PCRF may conclude that no further synchronization of state information is needed.

However, if either the number of active Gx sessions or the checksum of the Gx Origin-State-Id over all of the Gx sessions is incorrect, then the PCRF may begin auditing each of the individual Gx sessions. In one example, this auditing may be performed sequentially with some time spacing in order to avoid overwhelming the enforcement function. In another example, the auditing may be performed by RARing (i.e., sending a reauthentication request (RAR) message to) a particular session/user with state-id. If a reauthentication answer (RAA) message is returned to the PCRF indicating OK (i.e., the guessed state information was correct), the PCRF may move on to the next audit. Otherwise (e.g., wrong origin-_state-id), the PCRF may RAR for that session/user with some special replay indication/request. The enforcement function may then replay the credit control request-initial (CCR-I) message for that user.

Figure 1:
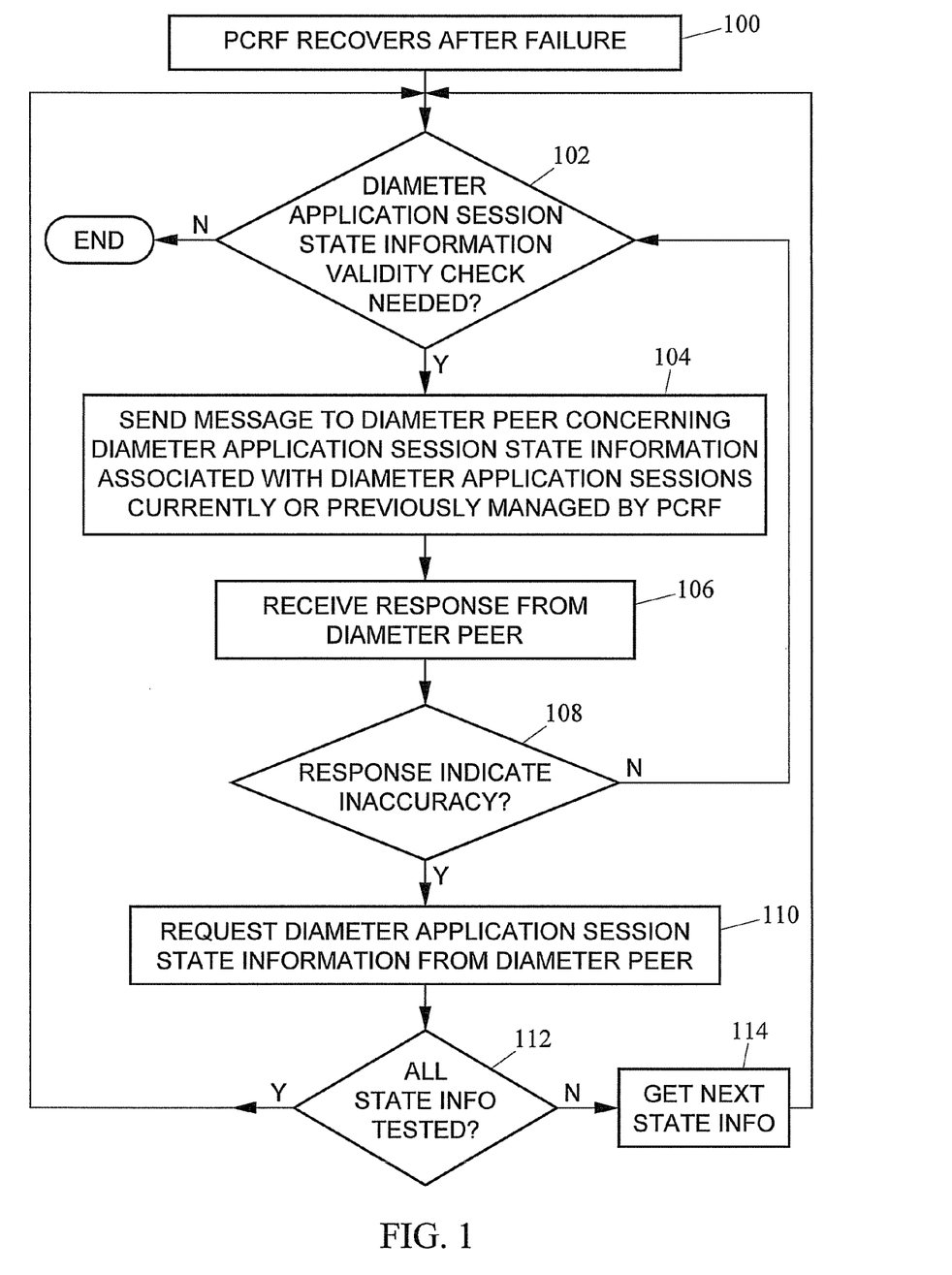
FIG. 1 is a flow chart showing exemplary steps for performing PCRF fault tolerance according to an embodiment of the subject matter described herein.

FIG. 1 is a flow chart showing exemplary steps for providing PCRF fault tolerance according to an embodiment of the subject matter described herein. Referring to FIG. 1, in step 100, the PCRF recovers after a failure. The failure may be a total or partial failure of hardware, software, firmware, or any combination thereof. Alternatively, step 100 may be omitted. In step 102, the PCRF determines whether a Diameter application session information validity check is needed. If a validity check is not needed, the process ends. If a validity check is needed, either due to a failure or because of a timer set for a periodic checking or auditing of the information, control proceeds to step 104 where the PCRF sends a message to a Diameter peer concerning Diameter application state information associated with Diameter application sessions currently or previously managed by the PCRF. In one example, the message may be out of band message that contains an indication, such as a checksum of some or all of the Diameter application state information maintained by the PCRF. In another embodiment, the message may be a request message that does not include an indication of the Diameter application state information maintained by the PCRF and instead requests that the Diameter peer provide an indication of the Diameter application state information that it maintains. In step 106, a response is received from the Diameter peer. In step 108, it is determined whether the response indicates inaccuracy of the Diameter application state information maintained by the PCRF. If the response does not indicate inaccuracy, control may return to step 102 where it is determined whether a validity check is needed. If, instead, it is determined that the response indicates inaccuracy, control proceeds to step 110 where Diameter application state information is requested for the portion of Diameter application state information maintained by the PCRF that was tested. In step 112, it is determined whether all Diameter application state information has been tested. If all of the Diameter application session state information has not been tested, control proceeds to step 114 where the next block or portion of state information is obtained or analyzed and control returns to step 102 where the steps for testing its validity are initiated. If all state information has been tested, control may also proceed to step 102 if periodic testing is to be repeated at a later time.

Figure 2:
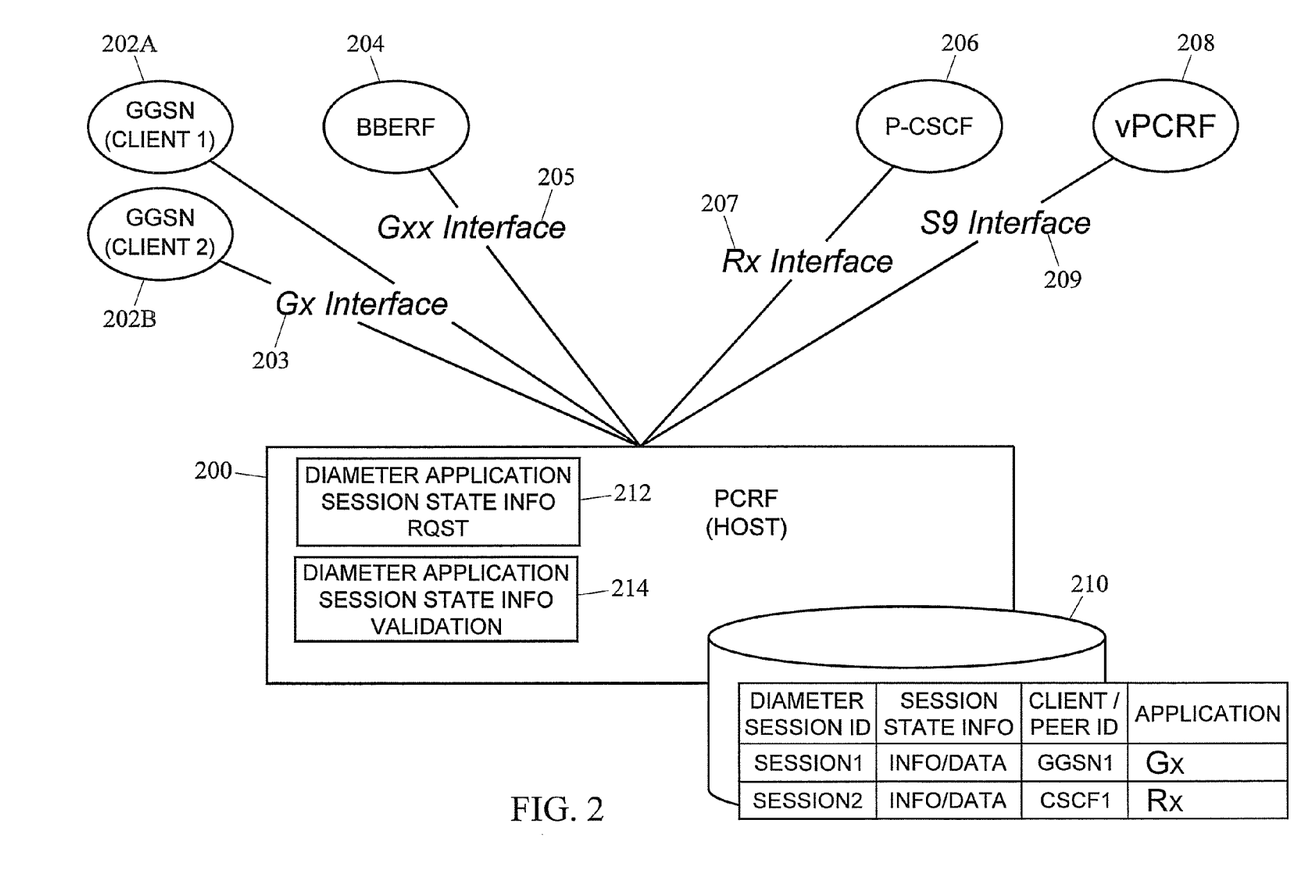
FIG. 2 is a network diagram showing exemplary components for performing PCRF fault tolerance according to an embodiment of the subject matter described herein.

FIG. 2 is a network diagram showing exemplary components for performing PCRF fault tolerance according to an embodiment of the subject matter described herein. Referring to FIG. 2, PCRF 200 may host one or more Gx sessions. PCRF 200 may be connected to GGSNs 202A and 202B via Gx interface 203. PCRF 200 may further be connected to bearer binding and event reporting function (BBERF) 204 via Gxx interface 205. PCRF 200 may further be connected to proxy call session control function (P-CSCF) 206 via Rx interface 207 and visited policy charging and rules function (vPCRF) 208 via S9 interface 209. As described in 3GPP TS 23.203 v 8.1.1, the S9 reference point resides between a PCRF in the HPLMN (H-PCRF) and a PCRF in the VPLMN (V-PCRF). For roaming with PCEF in visited network, the S9 reference point enables the Home PCRF to have dynamic control, via the V-PCRF, over the PCC behavior at a PCEF in the VPLMN. In all roaming scenarios, S9 has functionality to provide dynamic QoS control policies from the HPLMN, via a vPCRF, to a BBERF in the VPLMN. The vPCRF is a functional element that encompasses policy and charging control decision functionalities in the V-PLMN. The vPCRF includes functionality for both home routed access and visited access.

PCRF 200 may be associated with PCRF session state information cache 210 for storing state information associated with Diameter application sessions. For example, as shown in FIG. 2, cache 210 includes Diameter session IDs and their associated application session (e.g., Gx, Rx, etc.) state information, and a client/peer ID (e.g., GGSN1, CSCF1, etc.) PCRF 200 may also include internal components for providing PCRF fault tolerance according to an embodiment of the subject matter described herein. In the illustrated example, PCRF 200 may include a Diameter application state information request module 212, which may be configured to request Diameter application state information, for example, in response to recovering from a failure of PCRF 200 (e.g., software and/or hardware. Diameter application state information request module 212 may send the request to a Diameter peer (e.g., GGSN 202A). As stated above, the request may be an out-of-band message including an indication of the Diameter application session state information remaining at PCRF 200. In one example, the indication may be a checksum of the Diameter application session identifiers for active Diameter application sessions currently or previously managed by PCRF 200. GGSN 202A may receive the message, compute its own checksum of identifiers for the Diameter application sessions that it manages, and return an indication of the consistency of the Diameter application state information to PCRF 200. PCRF 200 may further include a Diameter application session state information validation module 214 may also be configured to determine whether the message received from GGSN 202A indicates that the Diameter application session state information maintained by PCRF 200 is consistent with that maintained by GGSN 202A. In response to determining that the information is not consistent, Diameter application session state information validation module 214 may trigger Diameter application session state information request module 212 to request that GGSN 202A provide copies of the Diameter application state information covered by the original checksum. Diameter application session state information request module 212 and Diameter application state information validation module 214 may repeat the process of requesting and validating different portions of the state information maintained by PCRF 200 until all of the Diameter application state information maintained by PCRF 200 has been validated.

Figure 3:
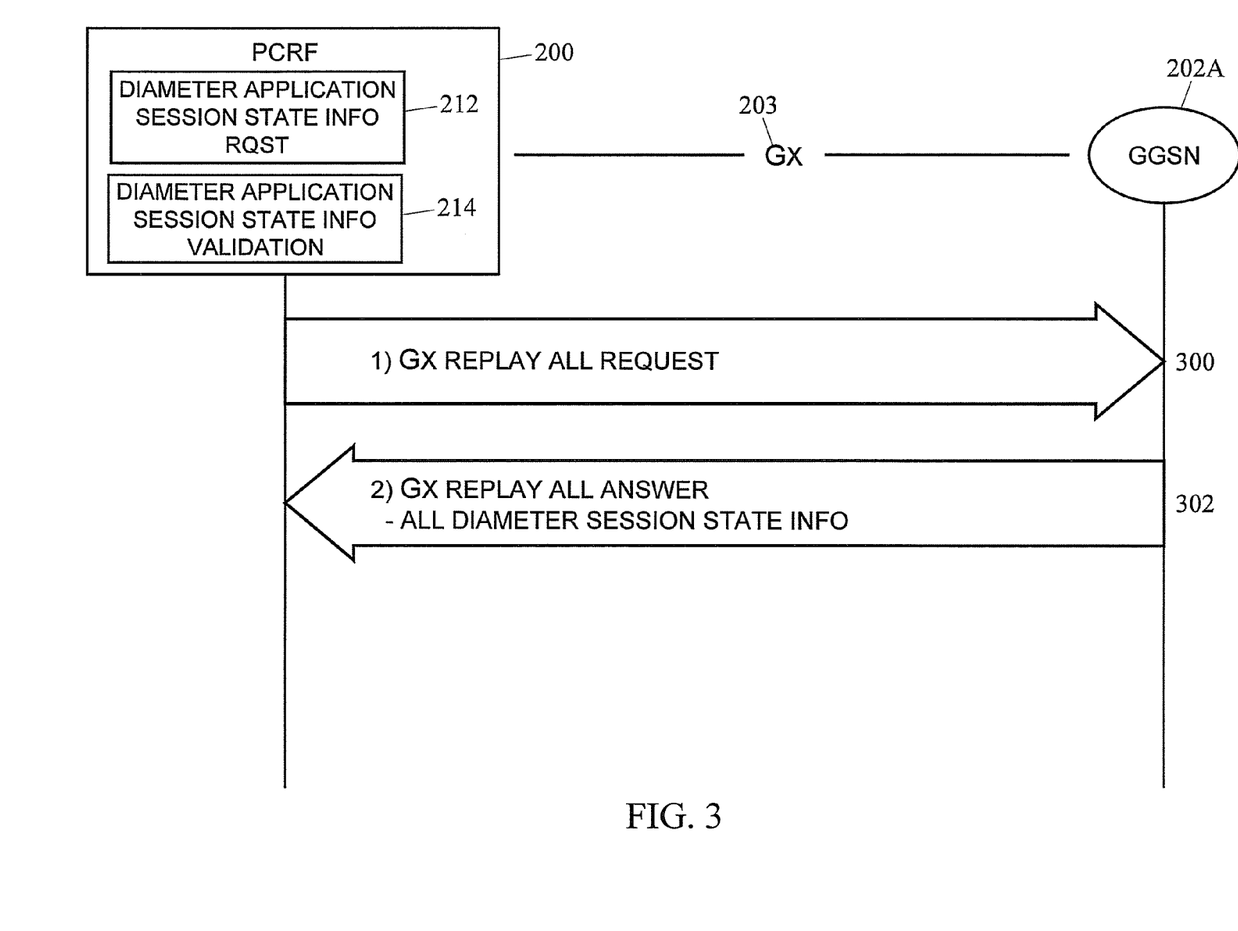
FIG. 3 is a message sequence diagram showing exemplary steps for recovering all Gx session state data according to an embodiment of the subject matter described herein.

In the preceding example, PCRF 200 includes an indication of the state information it retains in the message sent to GGSN 202A. In an alternate implementation, the message from PCRF 200 may be a request message that does not include an indication of the Diameter application session information maintained by PCRF 200. Rather, the message may request that GGSN 202A compute a checksum or other indication of some or all of the Diameter application session information that GGSN 202A maintains and include that information in a response to PCRF 200. PCRF 200 may receive the response, compute a checksum of the corresponding Diameter application state information that PCRF 200 maintains, and compare the computed checksum to the received checksum. If the checksums match, PCRF 200 may determine that the Diameter application session state information that it maintains is valid. If the checksums do not match, PCRF 200 may proceed as described above by requesting Diameter application session information determined to be invalid or inconsistent from the Diameter application session state information maintained by GGSN 202A and iteratively testing remaining portions of the Diameter application state information maintained by PCRF 200 until all of the information has been corrected. FIG. 3 is a message sequence diagram showing exemplary steps for recovering all Gx session state data according to an embodiment of the subject matter described herein. FIG. 3 shows Gx communication interface 203 between PCRF 200 and GGSN 202A. At the beginning of the illustrated sequence, PCRF 200 may detect a failure and then reboots and begins a recovery process. On reboot, it may be assumed that PCRF 200 is unaware of any Gx sessions (i.e., all Gx application data has been lost). Thus, PCRF 200 may send the GGSN 202A an out of band replay-all request message. For example, the out of band message may include a Gx reauthentication request (RAR) message for a fake user. The reauthentication request for a fake user may trigger GGSN 202A to send Diameter application session state information for user IDs covered by the fake user ID, which may be a group ID may be an ID for all Diameter application sessions between GGSN 202A and PCRF 200. Alternatively, instead of using a reauthentication request message, a special purpose Diameter or non-Diameter message may be used to trigger the sending of the complete set of Diameter application session state information. In FIG. 3, at step 300, PCRF 200 sends a replay all request message to GGSN 202A. In response, in step 302, GGSN 202A may return a replay all answer message to PCRF 200 that includes all Diameter session application state information for sessions involving PCRF 200 and GGSN 202A.

Figure 4:
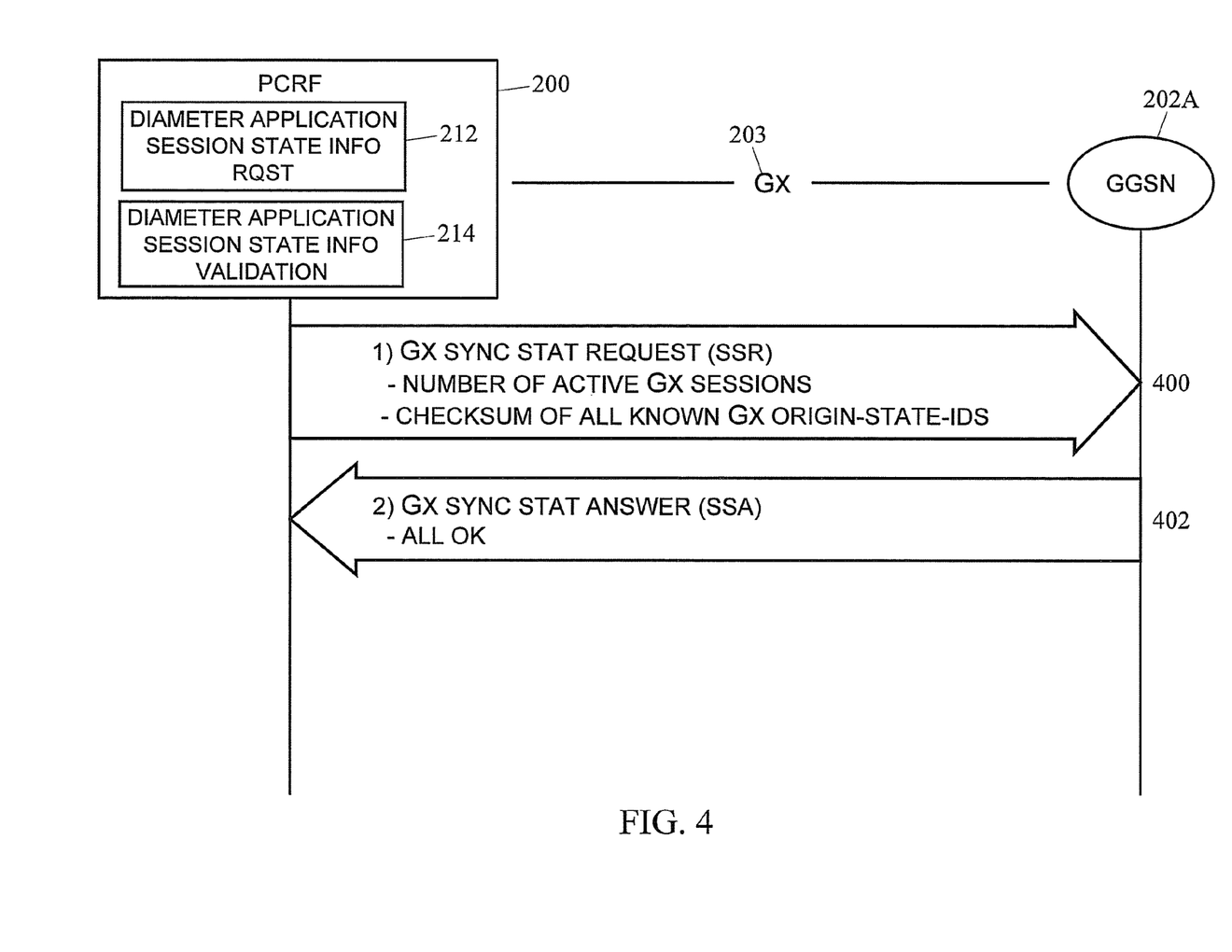
FIG. 4 is a message sequence diagram showing exemplary steps for recovering Gx session state data when the PCRF is aware of some active Gx sessions according to an embodiment of the subject matter described herein.

FIG. 4 is a message sequence diagram showing exemplary steps for recovering Diameter application session state data when the PCRF is aware of some active Gx sessions according to an embodiment of the subject matter described herein. At the beginning of the illustrated sequence, PCRF 200 may detect a failure, reboot, and begin a recovery process. In this example, it is assumed that PCRF 200 is aware of some or all active Gx sessions. Thus, PCRF 200 may determine that some Diameter application session state information has been lost. If PCRF 200 determines that it has some of the state information, it may send the enforcement an out of band message with an educated guess. This guess may include a number of active Gx sessions and a checksum of the Gx Origin-State-Id over all of the Gx sessions. For example, in one possible embodiment, the checksum may simply be the sum. If the out of band response comes back ok for both the number of active Gx sessions and the checksum of the Gx Origin-State-Id over all of the Gx sessions, then the PCRF may conclude that everything is fine and no further sync is needed.

In FIG. 4, at step 400, PCRF 200 may send a Gx sync stat request (SSR) message to GGSN 202A that includes a guess as to the correct number of active Gx sessions and a checksum of all known Gx Origin-State-Ids. In response, at step 402, GGSN 202A may return a Gx sync stat answer (SSA) message to PCRF 200 indicating that all is OK (i.e., all of the educated guesses in the SSR message were correct).

In an alternate implementation, in step 400, the message sent from PCRF 200 to GGSN 202A may simply be a request for an indication of Diameter application session state information for Diameter application sessions between PCRF and GGSN 202 in step 402 may include an answer that includes that indication. In such an implementation, PCRF 200 may compare the received, indication with a locally computed indication to determine whether the Diameter application state information that it maintains is valid.

Figure 5:
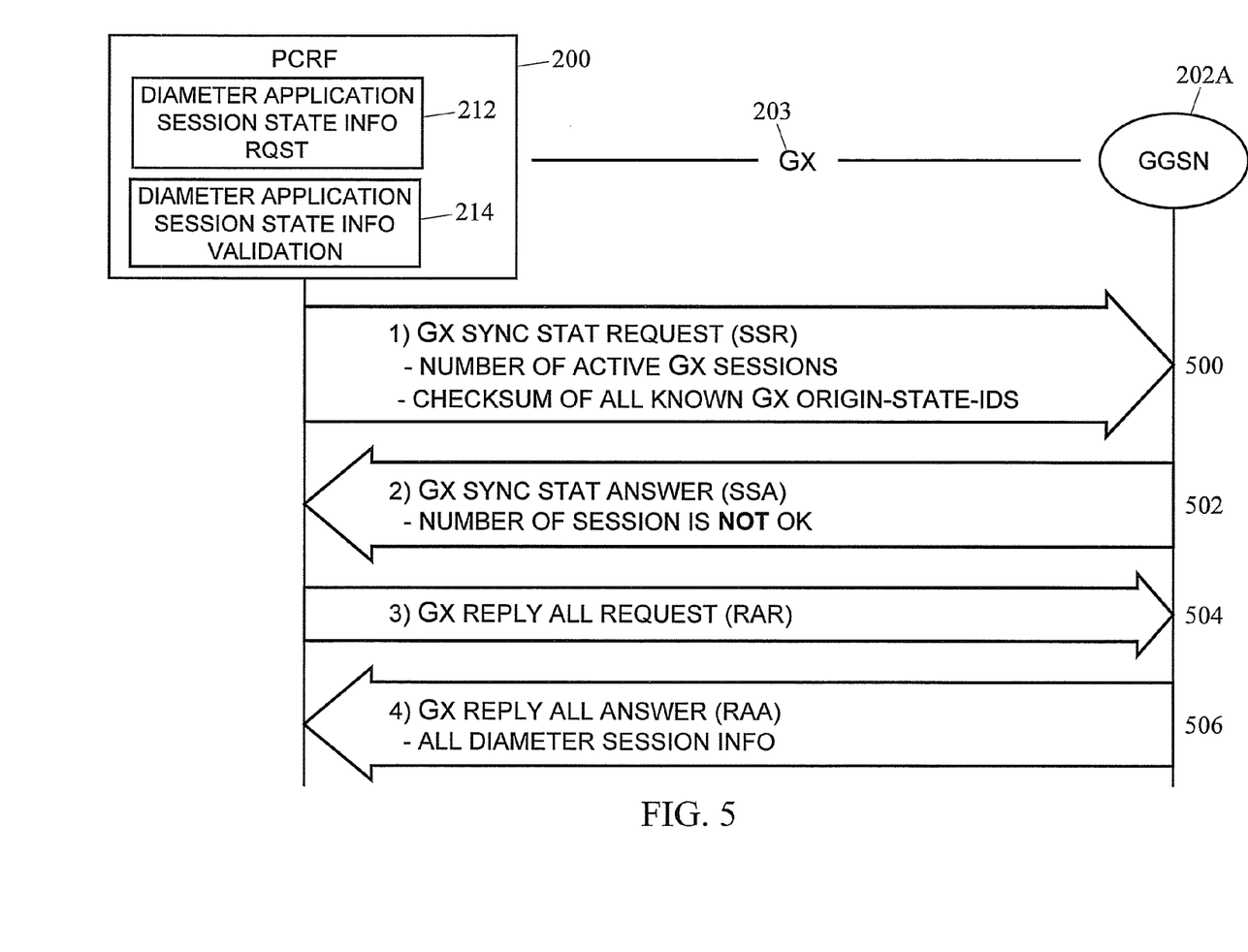
FIG. 5 is a message sequence diagram showing exemplary steps for recovering Gx session state data when the PCRF is aware of some active Gx sessions including follow up audit procedures according to an embodiment of the subject matter described herein.

FIG. 5 is a message sequence diagram showing exemplary steps for recovering Gx session state data when PCRF 200 is aware of some active Gx sessions, including follow up audit procedures according to an embodiment of the subject matter described herein. Initially, a failure of PCRF 200 may be detected and PCRF may reboot/recover. Once PCRF 200 recovers (from the boot), PCRF 200 may determine that it either has state info for all or some of the Gx sessions or it has lost everything. If PCRF 200 determines that it has some of the state information, it may send the enforcement an out of band message with an educated "guess." This guess may include a number of active Gx sessions and a checksum of the Gx Origin-State-Id over all of the Gx sessions. If either the number of active Gx sessions or the checksum of the Gx Origin-State-Id over all of the Gx sessions is incorrect, then PCRF 200 may start auditing all of the individual Gx sessions. For example, this auditing may be performed sequentially with some time spacing in order to avoid overwhelming the enforcement function. In one possible embodiment, the audit may be performed by RARing a particular session/user with state-id. If an RAA message is returned to PCRF 200 indicating OK, PCRF 200 may move on to the next audit. Otherwise (e.g., wrong origin_state-id), PCRF 200 may RAR for that session/user with some special replay indication/request. The enforcement function may then replay CCR-I for that user.

For example, at step 500, PCRF 200 may send a Gx sync stat request (SSR) message to GGSN 202A that includes an educated guess as to the number of active Gx sessions and a checksum of all known Gx Origin-State-IDs.

At step 502, GGSN 202A may return a Gx Sync Stat Answer (SSA) message to PCRF 200 that indicates that the number of sessions included in the Gx SSR message is not correct.

At step 504, PCRF 200 may send a Gx replay all request (RAR) message to GGSN 202A.

In response, at step 506, GGSN 202A may return a Gx replay all answer (RAA) message to PCRF 200 that includes all Diameter session information.

Figure 6:
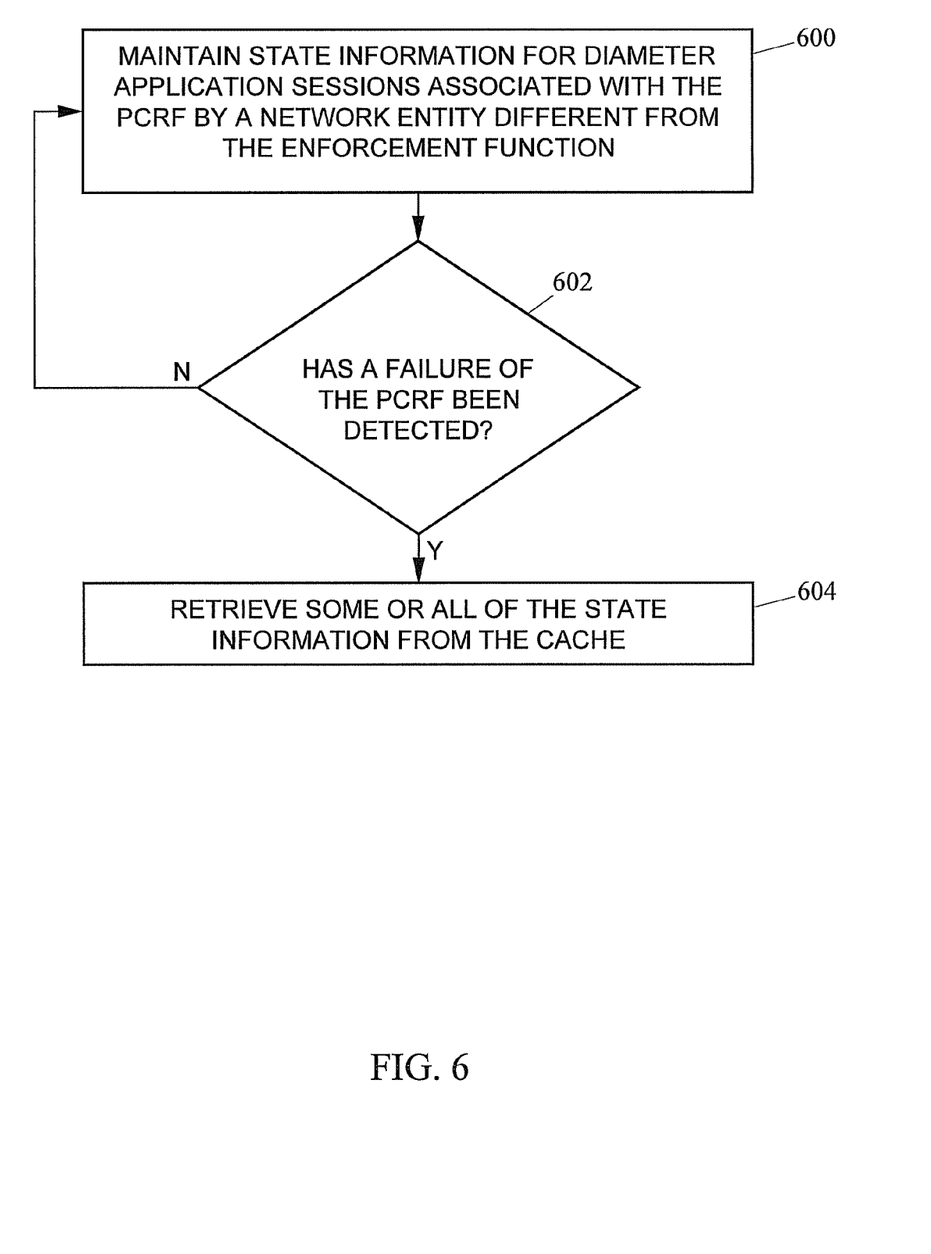
FIG. 6 is a flow chart showing exemplary steps for performing PCRF fault tolerance including caching and retrieving the state information according to an embodiment of the subject matter described herein.

FIG. 6 is a flow chart showing exemplary steps for performing PCRF fault tolerance including caching and retrieving the state information according to an embodiment of the subject matter described herein. Referring to FIG. 6, at step 600, state information for Diameter application sessions associated with the PCRF is maintained by a network entity different from the enforcement function. For example, the session state information may be stored in a session state information cache. In one embodiment, the cache may be co-located with and accessible by a Diameter signaling router (DSR).

At step 602, it is determined whether the PCRF has detected a failure. For example, this may include a hardware or software failure and may require a reboot of the PCRF.

At step 604, in response to detecting a failure of the PCRF, some or all of the state information is retrieved from a cache. For example, as described above, rather than simply retrieving all state information based on the assumption that all state information was lost and/or not trustworthy, the subject matter described herein provides for retrieving only state information that was actually lost. This determination may be made by using the state information that was retained, if any, to audit the rest of the information. Such a process provides a faster recovery of state information and full functionality of the PCRF from a failure than conventional methods because unnecessary recovery of state information the PCRF has retained in spite of the failure is avoided.

Figure 7:
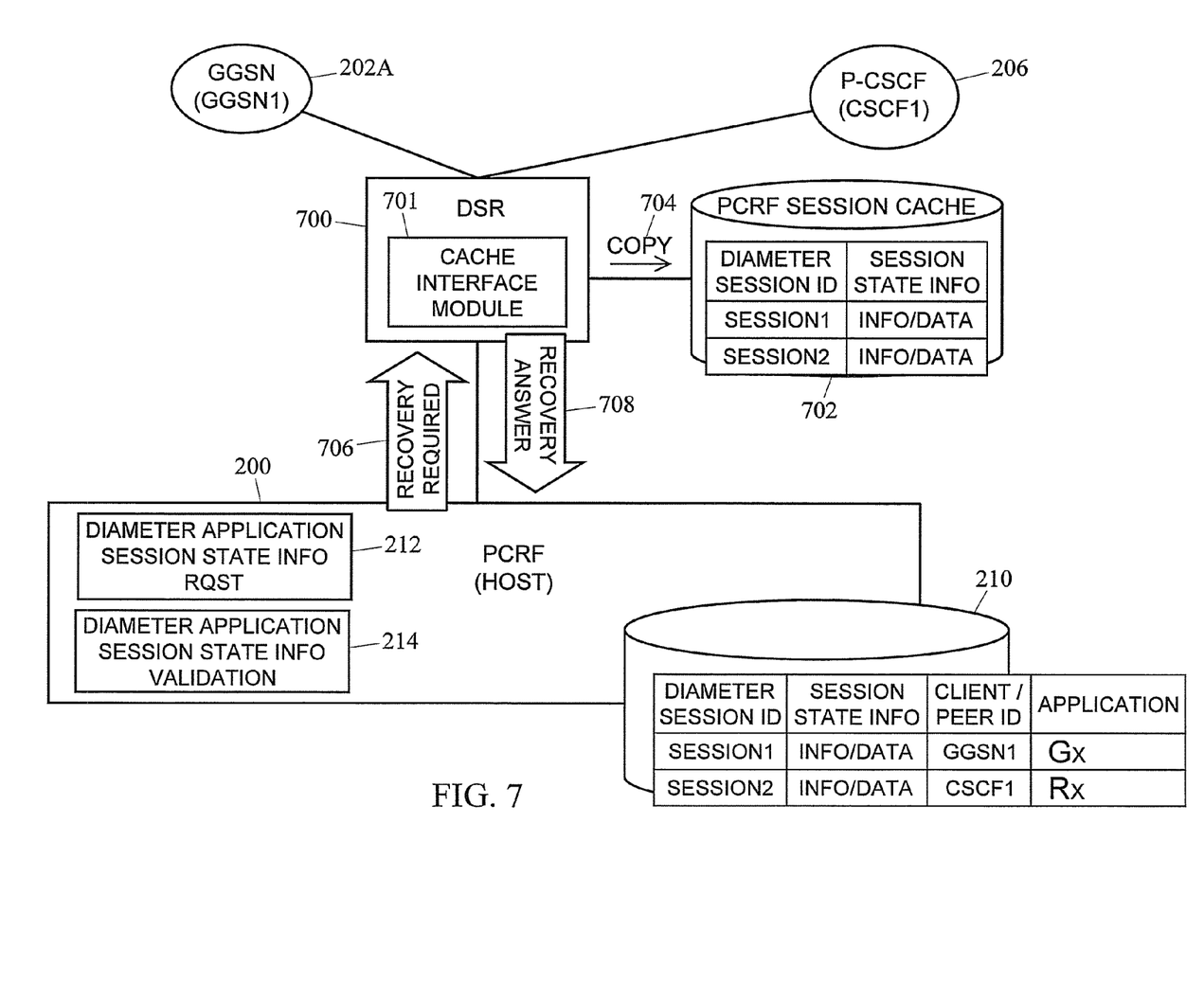
FIG. 7 is a network diagram showing exemplary components for performing PCRF fault tolerance including caching state information by a DRA according to an embodiment of the subject matter described herein.

FIG. 7 is a network diagram showing exemplary components for performing PCRF fault tolerance including caching state information by a DSR according to an embodiment of the subject matter described herein. Referring to FIG. 7, PCRF 200 may be connected to DSR 700, which may include Diameter routing agent, Diameter relay agent, and/or Diameter proxy agent functionality. DSR 700 may be connected to GGSN 202A and P-CSCF 206. Additionally, DSR 700 may be associated with PCRF session cache 702 for storing Diameter session IDs and their associated session state information.

In the embodiment shown in FIG. 7, DSR 700 is adapted to intercept Diameter signaling messages on one or more Diameter application interfaces associated with a PCRF (e.g., on a Gx, Gxx, Sp, Rx, S9) and copy Diameter session information contained in the intercepted messages. Specifically, cache interface module 701 may be configured to receive/intercept a request from PCRF 200 for session state information and, in response to receiving the request, to retrieve some or all of the state information from cache 702 and send the retrieved information to PCRF 200. The copied Diameter session information is stored at cache 702 that is associated with/accessible by DSR 700. For example, at step 704, DSR 700 may copy Diameter session information contained in intercepted messages and store the copied Diameter session information at cache 702.

If PCRF 200 encounters a failure and is forced to reboot/recover, PCRF 200 can query/access PCRF session cache 702 to obtain some or all session/state information. For example, at step 706, PCRF 200 may send a recovery request message to DSR 700 that includes a Diameter session ID Session1. In response, at step 708, DSR 700 may perform a lookup in session cache 702 for Session1 and return a recovery answer message that includes the session state information associated with Session1 obtained from cache 702.

Figure 8:
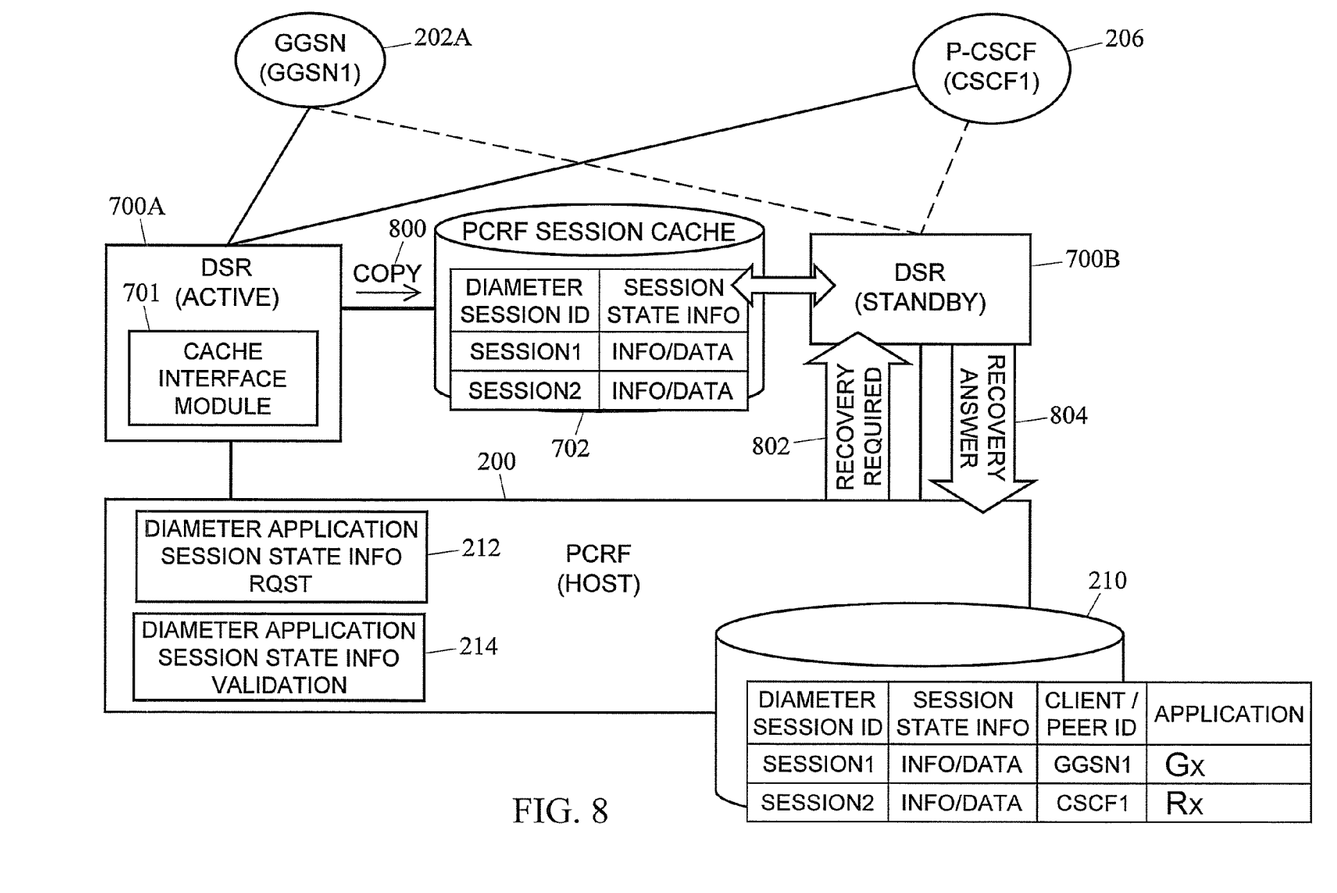
FIG. 8 is a network diagram showing exemplary components including an active and standby DRA for performing PCRF fault tolerance that includes caching state information by the active DRA according to an embodiment of the subject matter described herein.

FIG. 8 is a network diagram showing exemplary components including an active and standby DSR for performing PCRF fault tolerance that includes caching state information by the active DSR according to an embodiment of the subject matter described herein.

In this embodiment, a DSR agent is adapted to intercept Diameter signaling messages on a Gx, Gxx, Sp, Rx, S9 (or other Diameter application interfaces) associated with a PCRF and copy Diameter session information contained in the intercepted messages. The copied Diameter session information is stored at a cache that is associated with/accessible by the DSR.

Additionally, in the embodiment shown, multiple DSR may be deployed in a mated pair configuration, such as an active/standby configuration. The active DSR 700A may be adapted to intercept Diameter messages and populate the PCRF session cache. For example, at step 800, active DSR 700A may copy Diameter message information to PCRF session cache 702 which is also accessible by standby DSR 700B in the event of failure.

If PCRF 200 encounters a failure and is forced to reboot/recover, PCRF 200 may query/access PCRF session cache 702 via standby DSR 700B to obtain some or all session/state information. For example, standby DSR 700B may receive recovery request message 802 from PCRF 200 and, in response, may return recovery answer message 804 containing Diameter session state information retrieved from PCRF session cache 702. In this manner, active Diameter router 700A is not affected/hampered by the additional message traffic associated with the PCRF session state recovery process.

In the examples described above, the steps for PCRF fault tolerance are performed in response to a PCRF failure. However, the subject matter described herein is not limited to performing the steps for PCRF fault tolerance only after a PCRF fails. In an alternate embodiment, steps may be performed periodically by the PCRF and/or the DSR to maintain the accuracy of Diameter application session state information kept by the PCRF. For example, PCRF 200 may periodically perform the steps illustrated in FIG. 1 for iteratively auditing and requesting copies of Diameter application session state information determined to be invalid or inconsistent with that maintained by a Diameter peer, independently of any failure of PCRF 200. Similarly, DSR 700 illustrated in FIG. 7 may continually cache Diameter application session information and provide that information to PCRF upon request and independently of PCRF failure.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for policy and charging rules function (PCRF) fault tolerance, the method comprising:
    sending, from the PCRF to a Diameter peer, a message concerning Diameter application session state information associated with Diameter application sessions currently or previously managed by the PCRF;
    receiving, by the PCRF, a response from the Diameter peer in response to the message concerning the Diameter application session state information, wherein the response indicates a number of active Gx sessions associated with the Diameter peer;
    determining, by the PCRF and based on the response, whether the Diameter application session state information maintained by the PCRF is accurate with regard to Diameter application session state information maintained by the Diameter peer; and
    in response to determining that the Diameter application session state information maintained by the PCRF is not accurate, requesting, by the PCRF, accurate Diameter application session state information from the Diameter peer.

2. The method of claim 1 wherein sending the message concerning the Diameter application session state information includes sending the message to one of a gateway CPRS support node (GGSN), a proxy call session control function (P-CSCF), a policy and charging enforcement function (PCEF), a packet data network (PDN) gateway, a Diameter application server, and a deep packet inspection (DPI) function.

3. The method of claim 1 wherein sending the message concerning the Diameter application session state information includes sending the message by the PCRF in response to recovery from a failure of the PCRF.

4. The method of claim 1 wherein sending the message concerning the Diameter application session state information includes periodically sending the message to audit the active Diameter application session state information maintained by the PCRF.

5. The method of claim 1 wherein the message concerning the Diameter application session state information includes an indicator of the Diameter application session state information maintained by the PCRF and wherein the response includes an indicator of the consistency of the Diameter application session state information maintained by the PCRF with respect to Diameter application session state information maintained by the Diameter peer.

6. The method of claim 1 wherein the message concerning the Diameter application session state information comprises a query message, wherein the response includes an indicator of Diameter application session state information maintained by the Diameter peer, and wherein determining whether the Diameter session state information maintained by the PCRF is accurate includes analyzing the indicator in the response with respect to the Diameter application session state information maintained by the PCRF.

7. The method of claim 1 comprising caching Diameter application session state information at a Diameter signaling router (DSR) and wherein sending the message concerning the Diameter application session state information includes sending the message to the DSR.

8. The method of claim 7 wherein caching Diameter application session state information at the DSR includes intercepting Diameter signaling messages for the application sessions and caching information from the signaling messages at the DSR.

9. A system for policy and charging rules function (PCRF) fault tolerance, the system comprising:
    a PCRF, including:
        a Diameter application session state information request module embodied on the PCRF for sending from the PCRF to a Diameter peer, a message concerning Diameter application session state information associated with Diameter application sessions currently or previously managed by the PCRF; and
        a Diameter application session state information validation module embodied on the PCRF for receiving a response from a Diameter peer in response to the message concerning the Diameter application session state information, wherein the response indicates a number of active Gx sessions associated with the Diameter peer and for determining, based on the response, whether the Diameter application session state information maintained by the PCRF is accurate with regard to Diameter application session state information maintained by the Diameter peer, wherein, in response to a determination that the Diameter application session state information is not accurate, the Diameter application session state information request module is configured to request accurate Diameter application state information from the Diameter peer.

10. The system of claim 9 wherein sending the message concerning the Diameter application session state information includes sending the message to one of a gateway GPRS support node (GGSN), a proxy call session control function (P-CSCF), a policy and charging enforcement function (PCEF), a packet data network (PDN) gateway, a Diameter application server, and a deep packet inspection (DPI) function.

11. The system of claim 9 wherein sending the message concerning the Diameter application session state information includes sending the message by the PCRF in response to recovery from a failure of the PCRF.

12. The system of claim 9 wherein sending the message concerning the Diameter application session state information includes periodically sending the message to audit the active Diameter application session state information maintained by the PCRF.

13. The system of claim 9 wherein the message concerning the Diameter application session state information includes an indicator of the Diameter application session state information maintained by the PCRF and wherein the response includes an indicator of the consistency of the Diameter application session state information maintained by the PCRF with respect to Diameter application session state information maintained by the Diameter peer.

14. The system of claim 9 wherein the message concerning the Diameter application session state information comprises a query message, wherein the response includes an indicator of Diameter application session state information maintained by the Diameter peer, and wherein determining whether the Diameter session state information maintained by the PCRF is accurate includes analyzing the indicator in the response with respect to the Diameter application session state information maintained by the PCRF.

15. The system of claim 9 comprising a Diameter signaling router (DSR) for caching Diameter application session state information and wherein sending the message concerning the Diameter application session state information includes sending the message to the DSR.

16. The system of claim 15 wherein caching Diameter application session state information at the DSR includes intercepting Diameter signaling messages for the application sessions and caching information from the signaling messages at the DSR.

17. A system for policy and charging rules function (PCRF) fault tolerance, the system comprising:
   a Diameter signaling router (DSR) including:
      a Diameter application session state information cache for maintaining Diameter application session state information concerning Diameter application sessions currently or previously managed by a PCRF; and
      a Diameter application session state information cache interface module for receiving, from the PCRF, a message concerning Diameter application session state information maintained by the PCRF regarding application sessions currently or previously managed by the PCRF and for responding to the message based on the Diameter application session state information stored in the cache, wherein responding to the message includes a response that indicates a number of active Gx sessions associated with the PCRF.

18. The system of claim 17 wherein the message concerning the Diameter application session information includes a request for Diameter application state information maintained by the DSR and wherein the Diameter application session state information cache interface module is configured to provide a copy of the Diameter application session state information maintained in the cache in response to the request.

19. The system of claim 17 wherein the message concerning the Diameter application session state information includes a message for verifying the accuracy of the Diameter application session state information maintained by the PCRF.

20. A non-transitory computer readable medium having stored thereon executable instructions that when executed by a processor of a computer control the computer to perform steps comprising:
   sending, from a policy and charging rules function (PCRF) to a Diameter peer, a message concerning Diameter application session state information maintained by the PCRF regarding Diameter application sessions currently or previously managed by the PCRF;
   receiving, by the PCRF, a response from the Diameter peer in response to the message concerning the Diameter application session state information, wherein the response indicates a number of active Gx sessions associated with the Diameter peer;
   determining, by the PCRF and based on the response, whether the Diameter application session state information maintained by the PCRF is accurate with regard to Diameter application session state information maintained by the Diameter peer; and
   in response to determining that the Diameter application session state information maintained by the PCRF is not accurate, requesting, by the PCRF, accurate Diameter application session state information from by the Diameter peer.

* * * * *